United States Patent [19]

Leounes

[11] 4,337,752
[45] Jul. 6, 1982

[54] HEAT RE-TAINING COLLAR

[76] Inventor: Nicholas P. Leounes, 200 Howard Dr., Belleair Beach, Fla. 33535

[21] Appl. No.: 195,794

[22] Filed: Oct. 10, 1980

[51] Int. Cl.³ .............................................. F24C 15/10
[52] U.S. Cl. .................................. 126/215; 220/85 H
[58] Field of Search ................... 126/215, 214 D, 218, 126/55, 385, 390, 249, 252, 260, 256, 39 K, 39 M, 50; 220/85 H; 99/447

[56] References Cited

U.S. PATENT DOCUMENTS

| | | | |
|---|---|---|---|
| 862,719 | 8/1907 | Davis | 126/215 |
| 1,090,045 | 3/1914 | Gladden | 126/215 |
| 1,202,212 | 10/1916 | Parker | 126/215 |
| 2,080,592 | 5/1937 | Zickler | 126/376 |
| 3,372,830 | 3/1968 | Edwards | 220/469 X |

FOREIGN PATENT DOCUMENTS

| | | | |
|---|---|---|---|
| 213185 | 11/1908 | Fed. Rep. of Germany | 126/215 |
| 12863 | of 1889 | United Kingdom | 126/249 |

*Primary Examiner*—Samuel Scott
*Assistant Examiner*—Randall L. Green

[57] ABSTRACT

A collar-like device for reducing lateral heat dissipation from range top heating elements during cooking operations. An integrally-formed annular collar means of generally frusto-conical configuration is adapted to rest atop a range, in surrounding relation to a heating element disposed on said range top. A generally toroidally-shaped pocket of heated air surrounds an item of cookware adjacent its lower portion when such cookware is slideably received within the opening of the collar-like device surrounding the element.

A first alternative embodiment has a hollow collar so that a dead air space interiorly of the collar-like device provides an additional thermal barrier.

A second alternative embodiment provides a plurality of successively smaller nesting collars to accommodate cookware of differing sizes.

6 Claims, 6 Drawing Figures

HEAT RE-TAINING COLLAR

BACKGROUND OF THE INVENTION

1. Field of the Invention

This invention relates generally to energy-saving devices, more particularly to such devices for reducing heat loss due to lateral heat dissipation from heating elements during cooking procedures, and specifically relates to a collar-like device that surrounds a heating element and an item of cookware resting thereon to provide a barrier to heat transfer from said element to ambient.

2. Description of the Prior Art

The following U.S. patents were found in a search of patent literature:

U.S. Pat. Nos. 1,772,407 to Wilhelm; 1,984,708 to Surges; 2,024,510 to Crisenberry; 3,198,189 to Oatley and 3,515,116 to Finnstrand.

The device bearing the most similarity to that of the present invention is shown in the patent to Surges. However, the Surges device has utility in gas-fired ranges or stoves only, and does not capture the heat, as does the present invention, that emanates laterally from a typical heating element.

SUMMARY OF THE INVENTION

The state of the prior art indicates that a longstanding but heretofore unfulfilled need exists for a device that reduces lateral heat dissipation during the cooking process.

The present invention fulfills the identified need by providing an annular-in-configuration collar-like ring member of frusto-conical configuration. The base of the ring member has a predetermined diameter slightly greater than the diameter of a typical range top heating element, and is adapted to surround the heating element when said ring member is correctly positioned upon said range top. The annular wall of the ring member converges radially inwardly from the base thereof and terminates in a neck portion having a predetermined diameter sufficient to slidingly receive therein an item of cookware. Accordingly, heat that would otherwise dissipate in a generally lateral or radial direction from a conventional heating element during the cooking operation is trapped and contained within a generally toroidally-shaped air space that surrounds the base of the cookware, said air space collectively defined generally by the ring member, the external cylindrical wall of the cookware, and by the range top.

A hollow ring member providing a thermal barrier means in the form of a toroidal-in-configuration dead air space interiorly of said ring member further enhances the insulating effect of the collar-like device, and a plurality of internesting collar means of differing diameters is further provided so that items of cookware of differing sizes may be used in connection with the invention.

It is therefore seen to be the primary object of this invention to provide a device that conserves energy in range top cooking applications.

A closely related object is to provide such a device that enables relatively small items of cookware to be efficiently heated on relatively large range top heating elements.

Another closely related object is to provide such a device that enables relatively large items of cookware to be efficiently heated on relatively small range top heating elements.

Still another object is to provide such a device that is adaptable for use with items of cookware of differing sizes.

Yet another object is to provide such a device that decreases the amount of cooking time required for a given dish relative to the cooking time required therefor in the absence of such a device.

Another object is to provide such a device that enhances cooking safety by shielding the heating element against touching thereof.

Another object is to provide such a device that provides a heating element splash-guard function to facilitate range top cleaning in the event of a boil-over.

Still another object is to provide such a device that serves to stabilize items of cookware against accidental tipping thereof.

Still another object is to provide such a device that serves to maintain the contents of cookware in a hot or warm condition even after the heating element with which said cookware is associated has been de-activated, in restaurant steam-table fashion.

The invention accordingly comprises the features of construction, combination of elements, and arrangement of parts that will be exemplified in the construction hereinafter set forth, and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
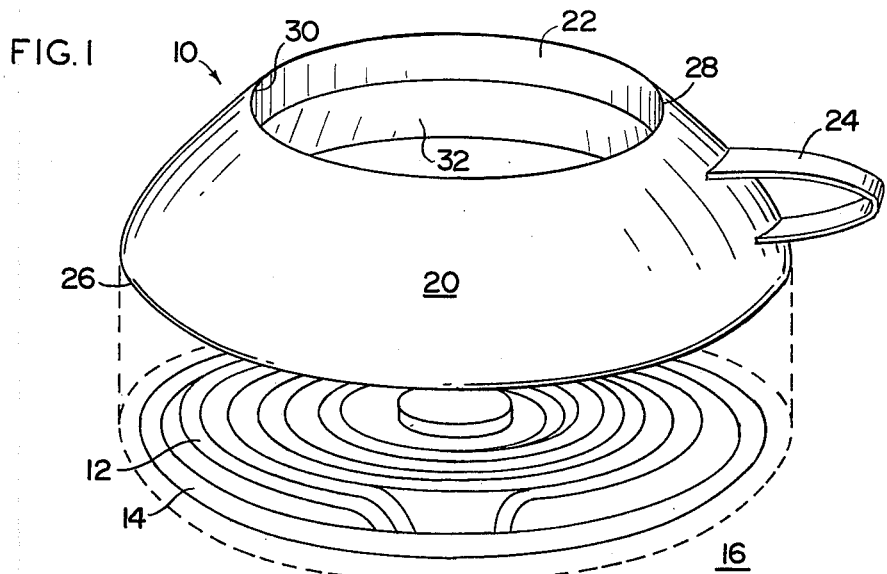
FIG. 1 is a perspective view of the preferred embodiment of the invention.

The preferred embodiment of the invention is shown in FIG. 1, and is generally designated 10.

Figure 2:
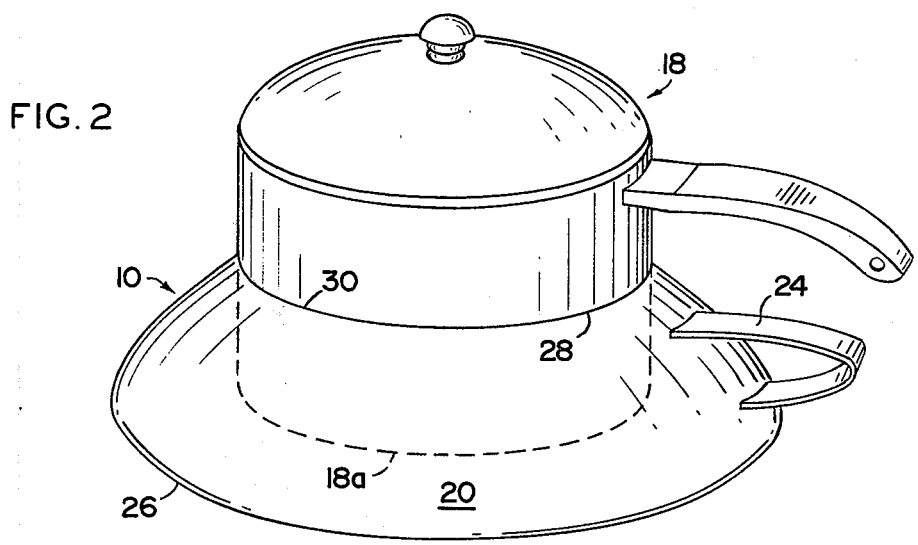
FIG. 2 is a perspective view showing an item of cookware having its lower portion slidingly received within the neck portion of the preferred embodiment, said lower portion shown in phantom lines.

An electrically-conductive spiral-in-configuration heating element 12 that produces heat as a by-product of electrical resistance responsive to current flow therethrough is shown disposed substantially centrally of an aperture 14 formed in a conventional range top 16 and lying in a horizontal plane for open communication and supporting engagement with the bottom of an item of cookware 18 that is shown in FIG. 2.

Although the invention will be shown and described in connection with such a heating element 12, it is clear that the invention has utility in connection with gas burners or other types of heating elements as well.

In this embodiment, the invention comprises an annular wall 20 of frusto-conical configuration, an annular flange 22 attached in depending relation to the uppermost edge of the annular wall 20, and a handle means 24 that is fixedly secured to the wall 20 in radial disposition at any convenient position. The frusto-conical configuration provides a base portion 26 having a predetermined diameter greater than the corresponding dimension of the neck portion 28. The base portion diameter is slightly greater than the diameter of the aperture 14 so that when the device 10 rests upon the range top 16, the base portion 26 of the device 10 is disposed in surrounding relation to the aperture 14 and hence the heating element 12.

The opening 30 defined by the neck portion 28 of the device 10 has a predetermined diameter sufficient to slidingly receive therein a typical item of cookware 18 in the manner as shown in FIG. 2.

When the heating element 12 is dissipating heat, the cookware 18 will increase in temperature responsive to heat transfer thereto from the element 12 by the processes known as radiation and conduction. In the absence of the inventive device 10, a third form of heat transfer, known as convection, will take place and transfer heat from the heating element 12 to the air surrounding the cookware 18. Such heat is, of course, of no value to the cooking process.

It is the heat lost primarily by convection-type heat transfer that the device 10 is structured to capture and retain. Inspection of FIG. 2 reveals that the range top 16, the exterior cylindrical walls of the cookware 18, and the internal surface of the annular wall 20 collectively define a toroidal volume of air space that surrounds the lower portion 18a of the cookware 18. As air trapped in this volume is heated, it rises and is deflected by the readially-converging annular wall 20 toward the annular depending flange 22, which flange 22 directs such air downwardly so that a generally circular air flow pattern is established. The temperature of the circulating air increases attendant continued re-cycling of the air and the cooking operation is enhanced due to the impinging of such heated, circulating air against the lower portion of the cookware 18a. The depending annular flange 22 also serves to help stabilize the cookware 18 against accidental tipping thereof.

Figure 3:
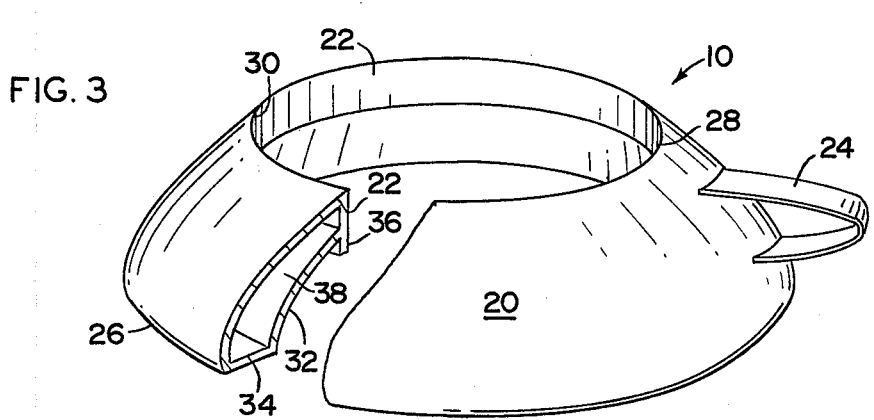
FIG. 3 is a partially cut-away perspective view of the first alternative embodiment of the invention, showing the hollow construction of the device that provides a dead air space to enhance the insulating effect of the invention.

The first alternative embodiment of the invention 10 is shown in FIG. 3. A second annular wall 32 is spaced radially inward of the first annular wall 20 and the walls 20, 32 are interconnected about their respective base portions by an annular, horizontally-disposed spacing wall 34 that is preferably integrally formed with the first and second annular walls 20, 32, as shown. A second flange 36 of annular configuration is shown attached in depending relation to the second annular wall 32, and this second flange 36 performs the function of the flange 22 of the first-described embodiment of the invention.

In this first alternative embodiment, the first annular flange 22 serves to seal the dead air space collectively defined by it, the spaced annular walls 20, 32, and the spacing wall 34. The provision of this dead air space or volume 38 further insulates the device 10 so that even greater air temperatures are achieved adjacent the lowermost portion 18a of the cookware 18, relative to the temperatures thereof achieved in connection with the first-described embodiment.

Figure 4:
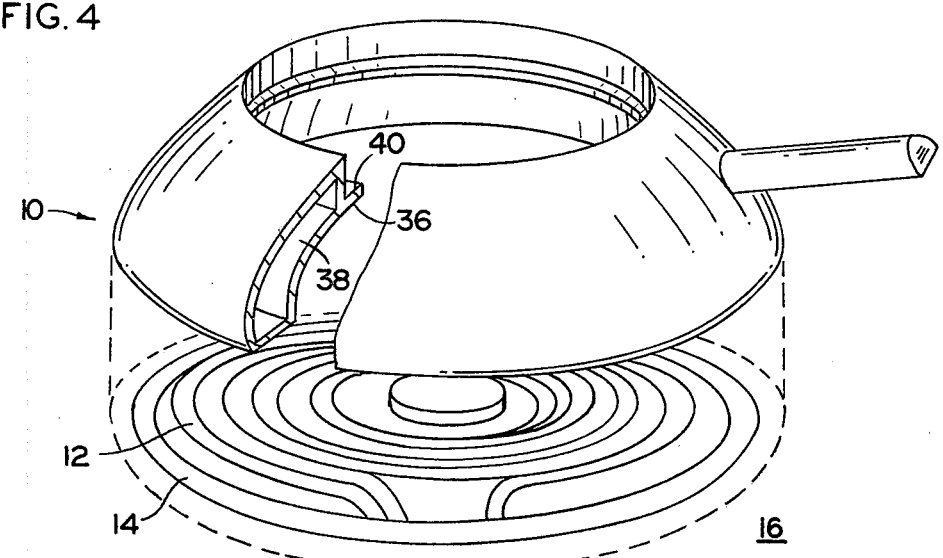
FIG. 4 is a partially cut-away perspective view of the second alternative embodiment of the invention, showing the radially-inwardly extending horizontally-disposed shelf means for supporting smaller-in-diameter nesting collar means.

Turning now to FIG. 4, there it will be seen that an annular, radially-inwardly extending, horizontally disposed shelf member 40 may be provided in connection with either the first or second-described embodiments. A plurality of successively smaller-in-diameter nesting collar means 42, 44 are provided, the largest one thereof adapted for releasable engagement with the annular shelf 40. Each nesting collar means 42, 44 is in turn provided with a similar shelf means 40a, 40b (FIGS. 5 and 6) for supporting releasable engagement with the next smaller-in-diameter nesting collar means. In this manner, the opening 30 defined by the neck portion 28 of the device 10 can be made effectively smaller to accomodate smaller items of cookware.

Figure 5:
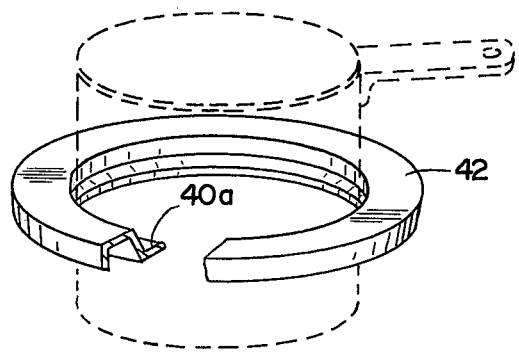
FIG. 5 is a partially cut-away perspective view of a nesting collar means that is supportingly engaged by the shelf means shown in FIG. 4, and further showing an item of cookware in mostly phantom lines received within said nesting collar means, said item of cookware having a smaller diameter than the item of cookware shown in FIG. 2.
Figure 6:
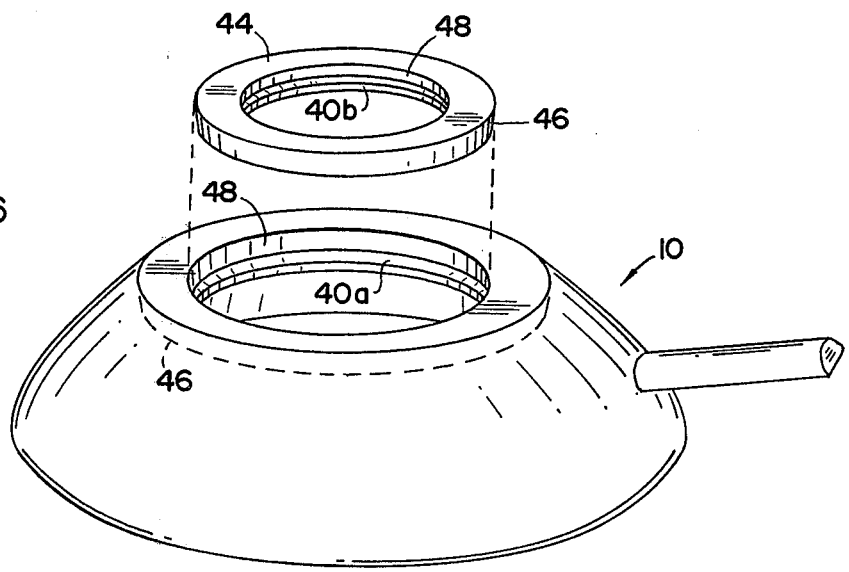
FIG. 6 is an exploded perspective view showing one nesting collar means correctly positioned upon the shelf member best seen in FIG. 4, and showing another nesting collar means in co-axial alignment therewith.

FIGS. 4, 5 and 6 show that the annular supporting shelves 40, 40a, 40b of the annular wall 20 and of the nesting collar means 42, 44, respectively, are easily provided in connection with either the hollow or non-hollow construction of the annular wall 20 (FIG. 4) or the nesting collar means 42, 44 (FIG. 5).

As best shown in FIG. 6, the exterior annular edgewall 46 of the nesting collar members 42, 44 is beveled, and a complementally-formed bevel is provided on the corresponding interior annular edgewall 48 of each preceding or succeeding nesting collar member.

Alternative forms of handle means 24a are also shown in FIGS. 4 and 6.

It will thus be seen that the objects set forth above, and those made apparent by the preceding description, are efficiently attained, and since certain changes may be made in the above construction without departing from the scope of the invention, it is intended that all matters contained in the foregoing description, or shown in the accompanying drawings, shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A heat retaining collar for use in intensifying and capturing the heat generated by a range burner which burner is disposed substantially centrally and horizontally coplanar with an aperture formed on a conventional range top, comprising, in combination, a spacing wall surrounding the aperture and supported on the range top, said spacing wall having an outer and an inner edge portion, a first annular wall extending upwardly and radially inwardly from said outer edge portion, a second annular wall extending upwardly and radially inwardly from said inner edge portion, said first and second annular walls interconnected remote from said spacing wall by means of an annular flange wall vertically oriented so that said flange wall, spacing wall and first and second annular walls together define a dead air space having an enlarged lower volume portion and a comparatively narrowed upper volume portion, an item of cookware to be disposed within said collar and supported by the burner so that a lower portion of a wall of the cookware item is surrounded by said collar, means contacting the cookware wall above the burner so as to define a further air space defined by said contacting means, said second annular wall, and the cookware wall, said further air space having a narrowed upper portion, said contacting means comprising an annular shelf member extending horizontally inwardly from and supported by said vertical flange, said contacting means further comprising a first nesting collar supported on said shelf member and extending radially inwardly, said nesting collar having an open inner portion adapted to receive the item of cookware therein.

2. The device of claim 1 wherein said nesting collar comprises an exterior annular edge wall, an interior annular edge wall, a substantially horizontal portion interconnecting top lips of said edge walls, and a horizontally disposed shelf member radiating inwardly from a lower portion of said interior annular edge wall to engage an outer surface of the item of cookware, each said nesting collar thereby overlapping an adjacent collar somewhat to enclose said further air space.

3. The device of claim 1, wherein interior surface areas of said annular wall are provided with a heat reflective material to enhance the operation of the device.

4. The device of claim 1, wherein a radially-outwardly-extending handle means is fixedly secured to an outer surface of said first annular wall to facilitate manipulation of said device.

5. The device of claim 1 including an annular shelf extending horizontally inwardly from and supported by said first nesting collar within said nesting collar's open inner portion adapted to receive a similar smaller dimensioned second nesting collar.

6. The device of claim 5 including further nesting collars similarly fashioned to reduce the size of the open inner portion.

* * * * *